(12) United States Patent
Crawford

(10) Patent No.: US 10,577,031 B2
(45) Date of Patent: Mar. 3, 2020

(54) TRUCK BED EXTENSION ASSEMBLY

(71) Applicant: Patti Crawford, Rochester, NY (US)

(72) Inventor: David Crawford, Rochester, NY (US)

( * ) Notice: Subject to any disclaimer, the term of this patent is extended or adjusted under 35 U.S.C. 154(b) by 57 days.

(21) Appl. No.: 15/949,108

(22) Filed: Apr. 10, 2018

(65) Prior Publication Data
US 2019/0308674 A1 Oct. 10, 2019

(51) Int. Cl.
*B62D 33/08* (2006.01)
*B60P 7/08* (2006.01)
*B62D 33/02* (2006.01)
*B60P 3/079* (2006.01)

(52) U.S. Cl.
CPC ............ *B62D 33/08* (2013.01); *B60P 7/0807* (2013.01); *B62D 33/02* (2013.01); *B60P 3/079* (2013.01)

(58) Field of Classification Search
CPC ........ B60P 1/003; B60P 7/0807; B62D 33/02; B62D 33/08
USPC ............................................. 296/26.09, 37.6
See application file for complete search history.

(56) References Cited

U.S. PATENT DOCUMENTS

| | | | |
|---|---|---|---|
| 5,468,038 A | 11/1995 | Sauri | |
| 5,649,731 A * | 7/1997 | Tognetti | B60P 1/003 296/26.09 |
| 5,938,262 A * | 8/1999 | Mills | B62D 33/08 296/26.09 |
| 6,312,034 B1 * | 11/2001 | Coleman, II | B60P 1/003 296/26.09 |
| 6,464,274 B2 * | 10/2002 | Mink | B60P 1/003 296/26.09 |
| 6,908,134 B1 | 6/2005 | Summers | |
| 6,932,404 B2 | 8/2005 | Vejnar | |
| 7,182,380 B2 | 2/2007 | Nagle | |
| 8,020,911 B2 * | 9/2011 | McKelvey | B60P 1/003 296/26.09 |
| 8,328,263 B1 * | 12/2012 | Alexander | B60R 5/041 296/26.09 |
| 2002/0140245 A1 * | 10/2002 | Coleman, II | B60P 1/003 296/26.09 |
| 2005/0161964 A1 * | 7/2005 | Adleman, Jr. | B60P 3/40 296/26.09 |
| 2007/0246496 A1 | 10/2007 | Reeves et al. | |
| 2018/0037274 A1 * | 2/2018 | Mathis | B60P 1/00 |

* cited by examiner

*Primary Examiner* — Jason S Daniels

(57) ABSTRACT

A first panel is slidably positionable in a bed of a truck. In a first position the first panel is contained in the bed. In a second position the first panel extends outwardly from a rear end to support an object that is longer than the bed. A pair of sliding units is each slidably coupled to the first panel and each of the sliding units is fastened to the bed of the pickup. Each of the sliding units facilitates the first panel to be urged between the first position and the second position while retaining the first panel in the bed of the pickup. A second panel is hingedly coupled to the first panel the second panel is positionable to be oriented perpendicular to the first panel to inhibit the object from sliding off of the first panel.

9 Claims, 7 Drawing Sheets

TRUCK BED EXTENSION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to extension devices and more particularly pertains to a new extension device for PURPOSE.

BRIEF SUMMARY OF THE INVENTION

An embodiment of the disclosure meets the needs presented above by generally comprising a first panel that is slidably positionable in a bed of a truck. An object may be positioned on the first panel for transporting the object. The first panel is positionable in a first position having the first panel being contained in the bed. The first panel is positionable in a second position has the first panel extending outwardly from a rear end to support an object that is longer than the bed. A pair of sliding units is each slidably coupled to the first panel and each of the sliding units is fastened to the bed of the pickup. Each of the sliding units facilitates the first panel to be urged between the first position and the second position while retaining the first panel in the bed of the pickup. A second panel is hingedly coupled to the first panel the second panel is positionable to be oriented perpendicular to the first panel to inhibit the object from sliding off of the first panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
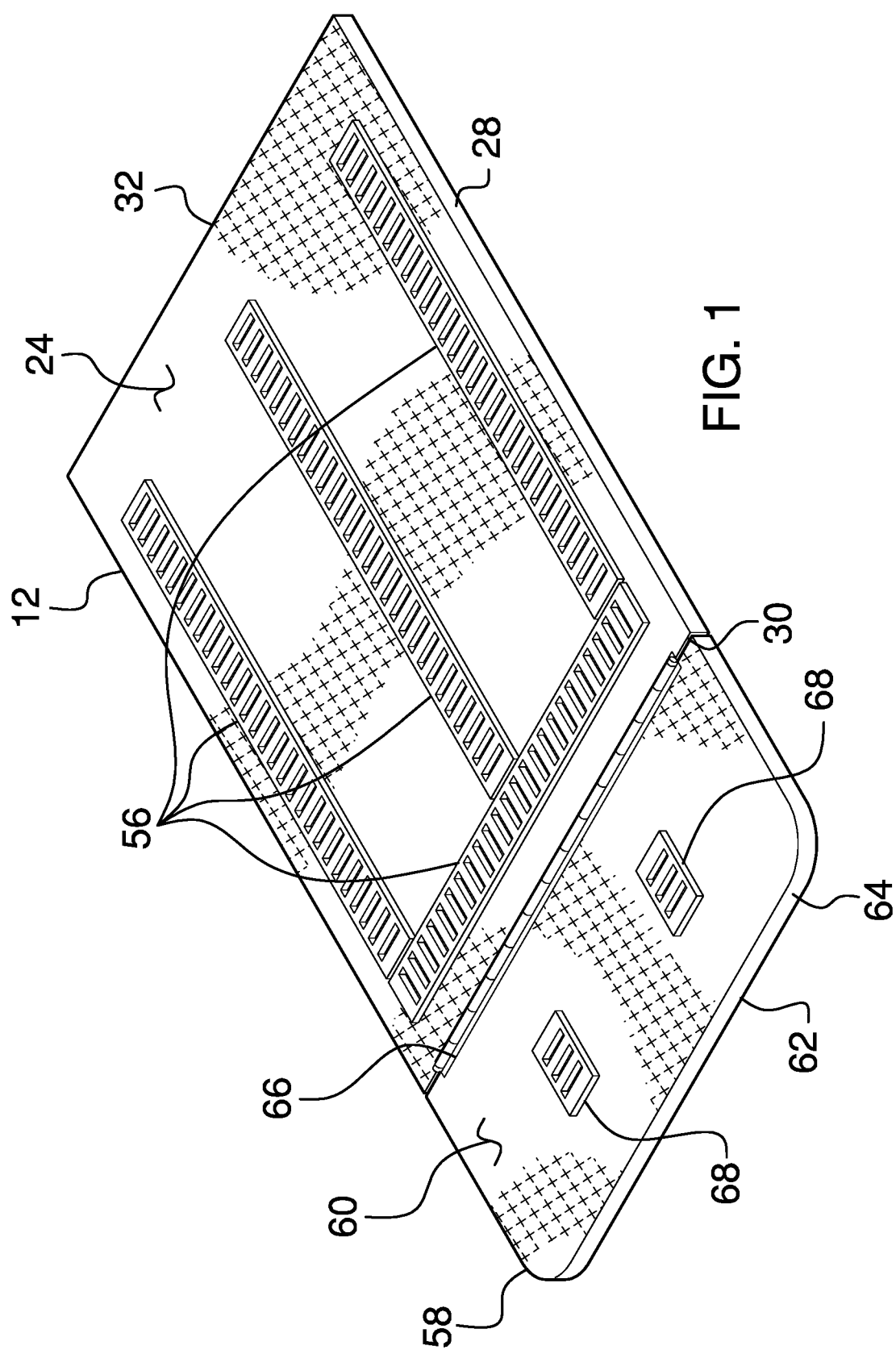
FIG. 1 is a top perspective view of a truck bed extension assembly according to an embodiment of the disclosure.
Figure 2:
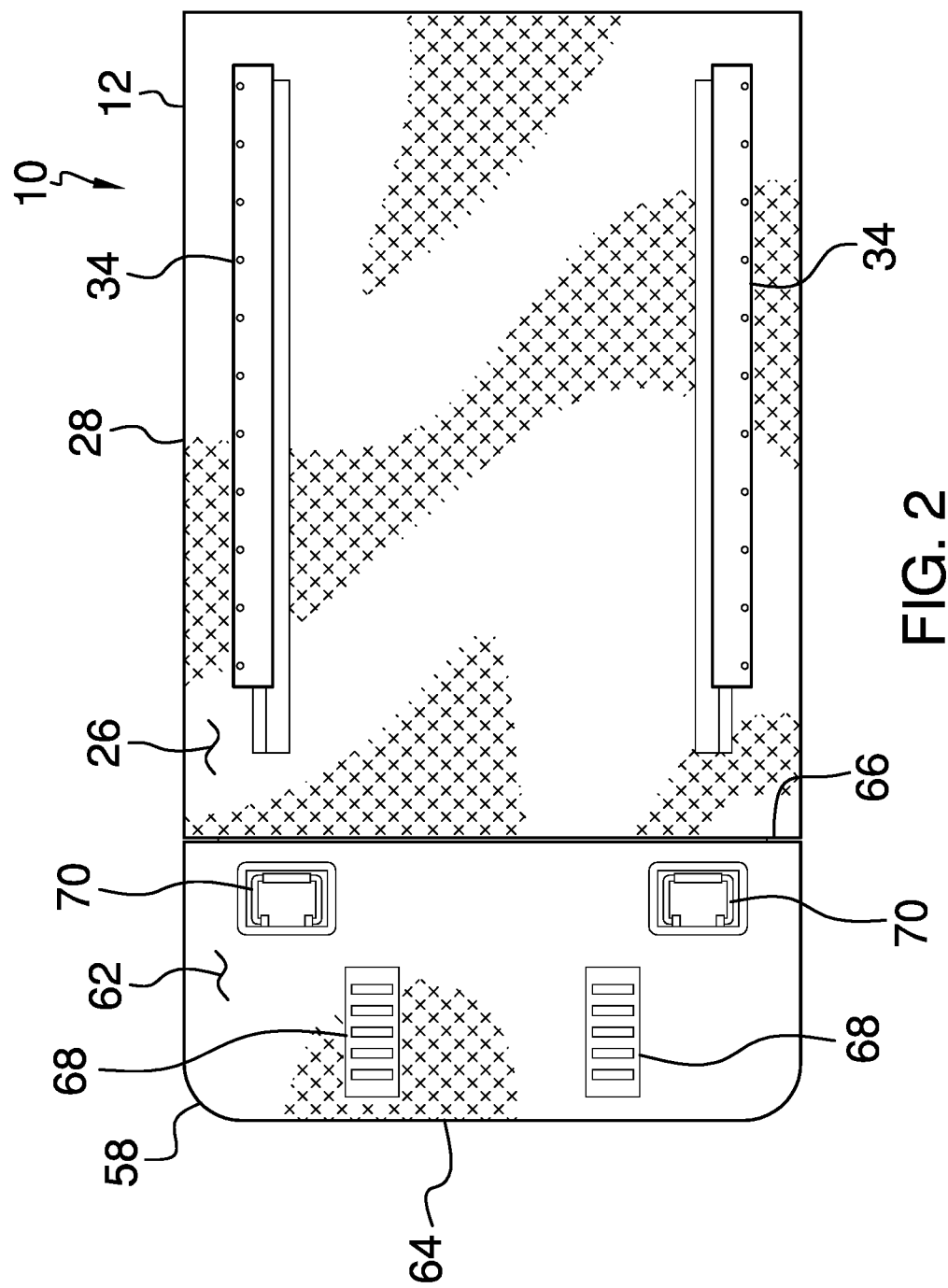
FIG. 2 is a bottom view of an embodiment of the disclosure.
Figure 3:
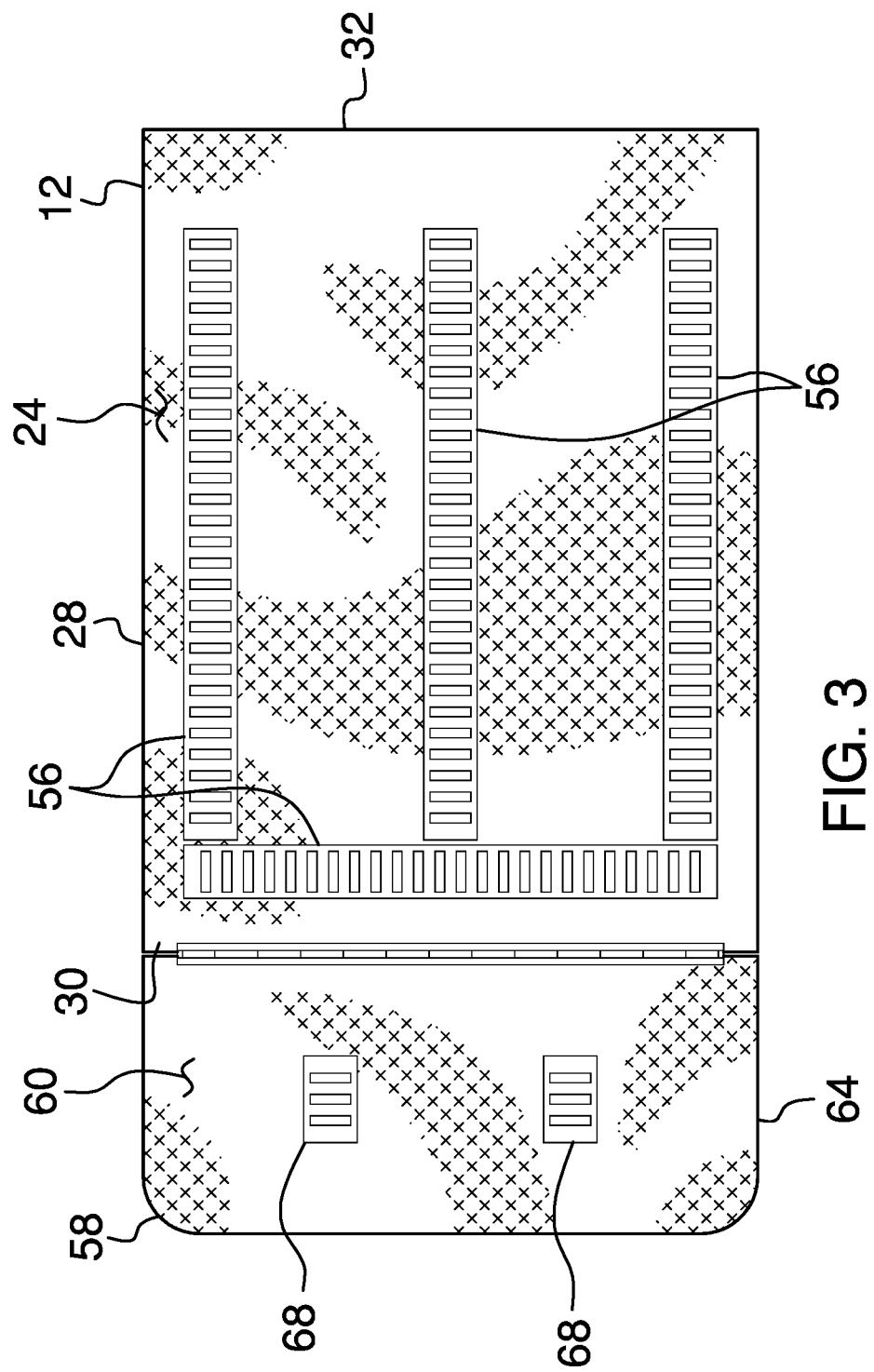
FIG. 3 is a top view of an embodiment of the disclosure.
Figure 4:
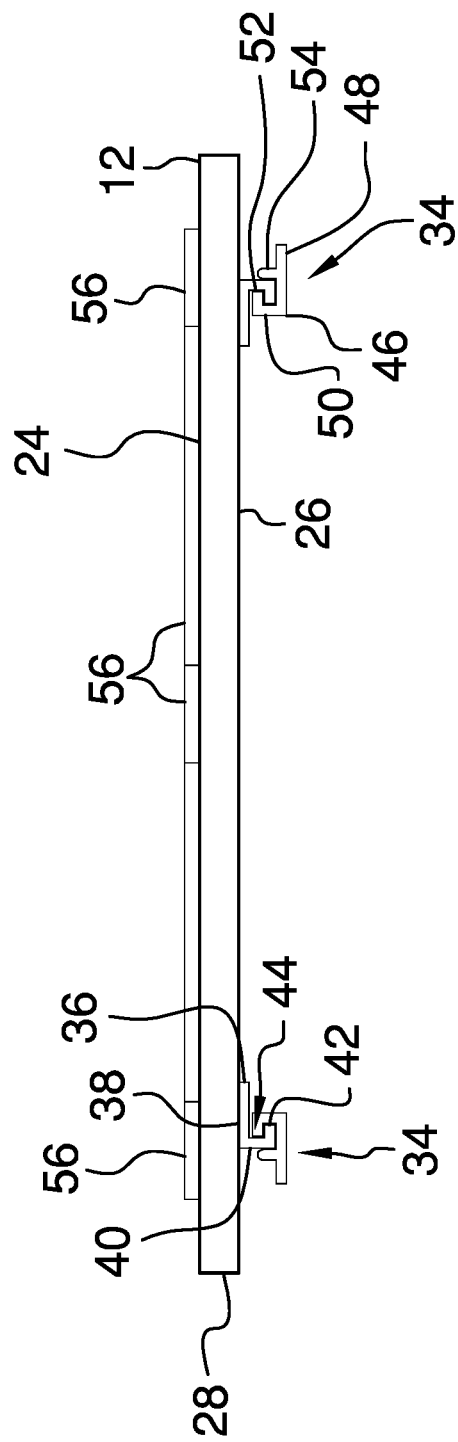
FIG. 4 is a front view of an embodiment of the disclosure.
Figure 5:
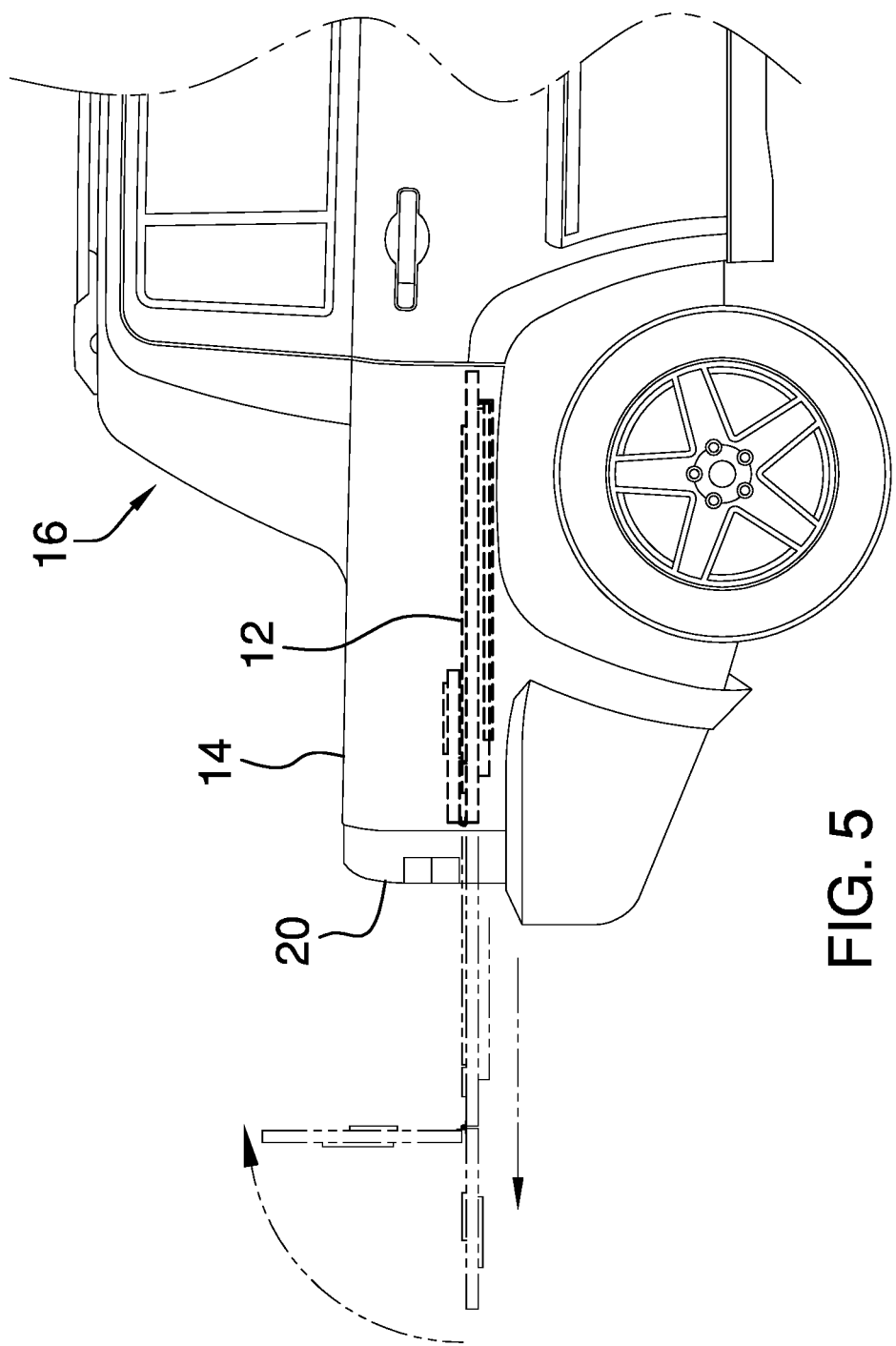
FIG. 5 is a perspective in-use view of an embodiment of the disclosure.
Figure 6:
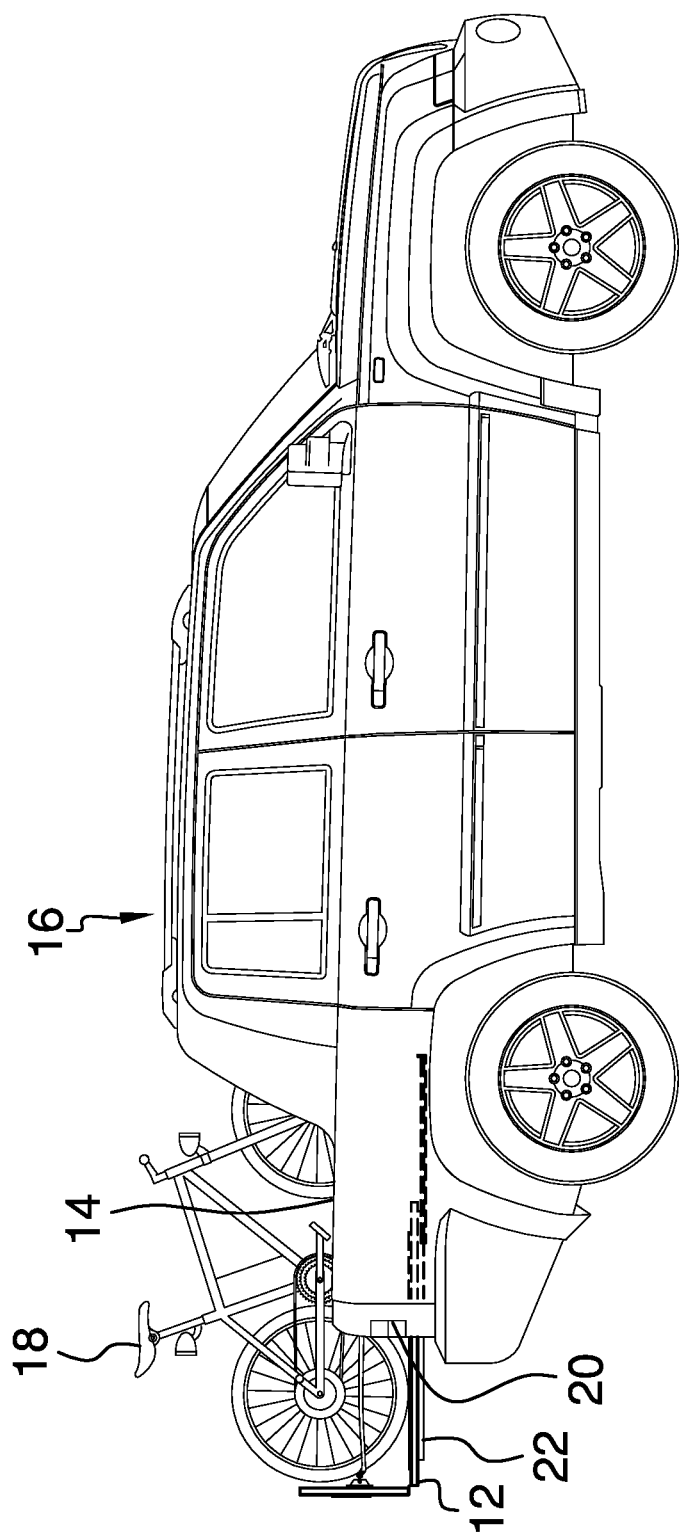
FIG. 6 is a perspective in-use view of an embodiment of the disclosure showing each of a first panel and a second panel in a second position.
Figure 7:
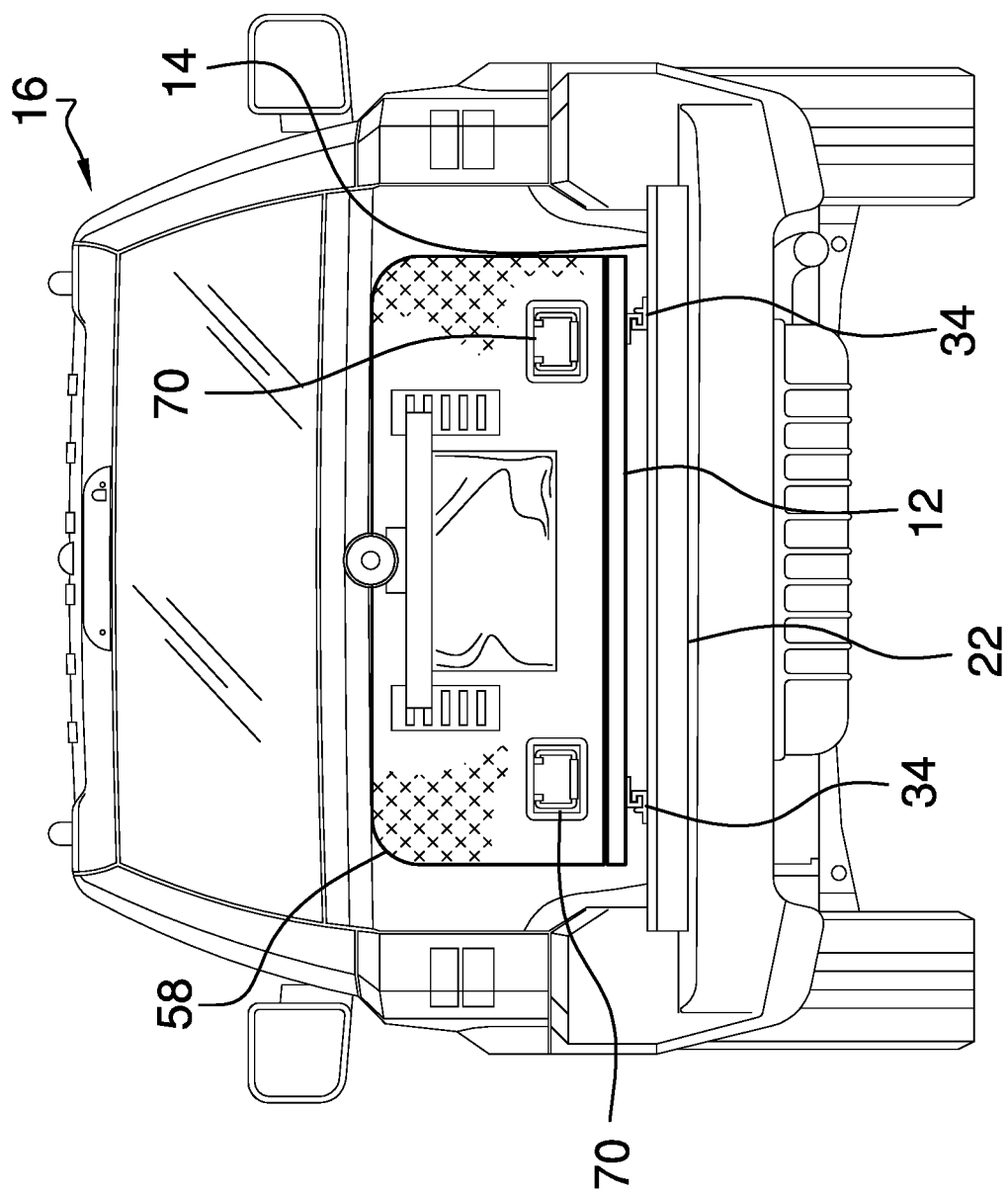
FIG. 7 is a rear perspective view of an embodiment of the disclosure.

With reference now to the drawings, and in particular to FIGS. 1 through 7 thereof, a new extension device embodying the principles and concepts of an embodiment of the disclosure and generally designated by the reference numeral 10 will be described.

As best illustrated in FIGS. 1 through 7, the truck bed extension assembly 10 generally comprises a first panel 12 that is slidably positionable in a bed 14 of a truck 16 and an object 18 may be positioned on the first panel 12 for transporting the object 18. The first panel 12 is positionable in a first position having the first panel 12 being contained in the bed 14. Moreover, the first panel 12 is positionable in a second position having the first panel 12 extending outwardly from a rear end 20 of the bed 14. In way the first panel 12 may support an object 18 that is longer than the bed 14. The truck 16 may be a pickup truck and the bed 14 may have a tailgate 22, and the tailgate 22 is opened to allow the first panel 12 to be positioned in the second position. The first panel 12 has a first surface 24, a second surface 26 and a peripheral edge 28 extending therebetween, and the peripheral edge 28 has a back side 30 and a front side 32.

A pair of sliding units 34 is provided and each of the sliding units 34 is slidably coupled to the first panel 12. Additionally, each of the sliding units 34 is fastened to the bed 14 of the truck 16 using fasteners, such as screws or bolts. Each of the sliding units 34 facilitates the first panel 12 to be urged between the first position and the second position while retaining the first panel 12 in the bed 14 of the pickup. Each of the sliding units 34 comprises a track 36 that has a basal portion 38, a leg 40 extending downwardly from the basal portion 38 and a foot 42 that is spaced from the basal portion 38. Thus, a space 44 is defined between the foot 42 and the basal portion 38. The basal portion 38 is coupled to the first surface 24 of the first panel 12 and the track 36 extends between the front side 32 and the back side 30.

Each of the sliding units 34 includes a rail 46 that has a basal portion 48, a leg 50 extending upwardly from the basal portion 48 of the rail 46 and a foot 52 that is spaced from the basal portion of the rail 46. The basal portion 48 of the rail 46 is attached the bed 14 and the foot 52 of the rail 46 is slidably positioned in the space 44 in the track 36. The basal portion 48 of the rail 46 has a lobe 54 extending upwardly therefrom and the lobe 54 is coextensive with the basal portion of the rail 46. The lobe 54 is spaced from the leg 50 on the rail 46 and the lobe 54 frictionally engages the leg 40 on the track 36 to inhibit the foot 42 on the track 36 from sliding out of the space 44.

A plurality of first tie downs 56 is provided and each of the first tie downs 56 is coupled to the first panel 12. A strap or other securing device is secured to a selected first tie down 56 for tying the object 18 the first panel 12. The first tie downs 56 are spaced apart from each other and are distributed on the first surface 24 of the first panel 12. Each of the first tie downs 56 may comprise cargo rail, cargo loops and any other conventional means of securing a cargo strap to the first panel 12.

A second panel 58 is provided and the second panel 58 is hingedly coupled to the first panel 12. The second panel 58 is positionable in a first position having the second panel 58 being oriented co-linear with the first panel 12 for supporting the object 18. Additionally, the second panel 58 is positionable in a second position having the second panel 58 being oriented perpendicular to the first panel 12 and extending upwardly from the first panel 12. In this way the second panel 58 inhibits the object 18 from sliding off of the first panel 12. The second panel 58 has a primary surface 60, a secondary surface 62 and an outer edge 64 extending therebetween. The outer edge 64 has a forward side 66 and the primary surface 60 is hingedly coupled to the first surface 24 of the first panel 12 having the forward side 66 being aligned with the back side 30 of the first panel 12.

A plurality of second tie downs 68 is provided and each of the second tie downs 68 is coupled to the second panel 58. A strap or the like is secured to a selected second tie down 68 for securing the object 18 the second panel 58. The second tie downs 68 are distributed on the primary surface 60 of the second panel 58 and the second surface 26 of the second panel 58. A pair of handles 70 is provided and each of the handles 70 is coupled to the secondary surface 62 of the second panel 58 for gripping. Moreover, each of the handles 70 may be recessed into the secondary surface 62.

In use, object(s) 18 is/are positioned on the first panel 12 when the first panel 12 is positioned in the first position thereby facilitating the object 18s to be transported in the bed 14. The tailgate 22 is opened and the first panel 12 is urged into the second position thereby facilitating the object (s) 18 to be accessible without having to climb into the bed 14 to retrieve the object(s) 18. Alternatively, the tailgate 22 is opened and the first panel 12 is urged into the second position to increase an effective length of the bed 14 for transporting an object(s) 18 that is longer than the bed 14. The second panel 58 is selectively positioned in the second position to inhibit the object(s) 18 from sliding off of the first panel 12 and falling out of the bed 14. The second panel 58 lies upon the first panel 12 when the second panel 58 is positioned in the first position. Moreover, the second panel 58 may be additionally positioned in a third position having the second panel 58 extending rearwardly away from the first panel 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck bed extension assembly being configured to be positioned in a bed of a truck for extending an effective length of the bed for transporting an object that would otherwise be too long for the bed, said assembly comprising:
  a first panel being slidably positionable in the bed of the truck wherein said first panel is configured to have the object positioned thereon for transporting the object, said first panel being positionable in a first position having said first panel being contained in the bed, said first panel being positionable in a second position having said first panel extending outwardly from a rear end of the bed wherein said first panel is configured to support the object that is longer than the bed;
  a pair of sliding units, each of said sliding units being slidably coupled to said first panel, each of said sliding units being fastened to the bed of the pickup, each of said sliding units facilitating said first panel to be urged between said first position and said second position while retaining said first panel in the bed of the pickup;
  a second panel being hingedly coupled to said first panel, said second panel being positionable in a first position having said second panel being oriented co-linear with said first panel wherein said second panel is configured to support the object, said second panel being positionable in a second position having said second panel being oriented perpendicular to said first panel wherein said second panel is configured to inhibit the object from sliding off of said first panel.

2. The assembly according to claim 1, wherein:
  said first panel has a first surface, a second surface and a peripheral edge extending therebetween, said peripheral edge having a back side and a front side; and
  each of said sliding units comprises a track having a basal portion, a leg extending downwardly from said basal portion and a foot being spaced from said basal portion defining a space between said foot and said basal portion, said basal portion being coupled to said first surface of said first panel, said track extending between said front side and said back side.

3. The assembly according to claim 2, wherein each of said sliding units comprises a rail having a basal portion, a leg extending upwardly from said basal portion of said rail and a foot being spaced from said basal portion of said rail, said basal portion of said rail being attached the bed, said foot of said rail being slidably positioned in said space in said track.

4. The assembly according to claim 3, wherein said basal portion of said rail has a lobe extending upwardly therefrom and being coextensive with said basal portion of said rail, said lobe being spaced from said leg on said rail, said lobe frictionally engaging said leg on said track to inhibit said foot on said track from sliding out of said space.

5. The assembly according to claim 1, further comprising a plurality of first tie downs, each of said first tie downs being coupled to said first panel wherein each of said first tie downs is configured to have a strap secured thereto for tying the object said first panel, said first tie downs being spaced apart from each other and being distributed on a first surface of said first panel.

6. The assembly according to claim 1, wherein:
said first panel has a back side; and
said second panel has a primary surface, a secondary surface and an outer edge extending therebetween, said outer edge having a forward side, said forward side being hingedly coupled to said back side of said first panel.

7. The assembly according to claim 6, further comprising a plurality of second tie downs, each of said second tie downs being coupled to said second panel wherein each of said second tie downs is configured to have a strap secured thereto for tying the object said second panel, said second tie downs being distributed on said primary surface of said second panel and said second surface of said second panel.

8. The assembly according to claim 7, further comprising a pair of handles, each of said handles being coupled to said secondary surface of said second panel for gripping, each of said handles being recessed into said secondary surface.

9. A truck bed extension assembly being configured to be positioned in a bed of a truck for extending an effective length of the bed for transporting an object that would otherwise be too long for the bed, said assembly comprising:
a first panel being slidably positionable in the bed of the truck wherein said first panel is configured to have the object positioned thereon for transporting the object, said first panel being positionable in a first position having said first panel being contained in the bed, said first panel being positionable in a second position having said first panel extending outwardly from a rear end of the bed wherein said first panel is configured to support the object that is longer than the bed, said first panel having a first surface, a second surface and a peripheral edge extending therebetween, said peripheral edge having a back side and a front side;
a pair of sliding units, each of said sliding units being slidably coupled to said first panel, each of said sliding units being fastened to the bed of the pickup, each of said sliding units facilitating said first panel to be urged between said first position and said second position while retaining said first panel in the bed of the pickup, each of said sliding units comprising:
a track having a basal portion, a leg extending downwardly from said basal portion and a foot being spaced from said basal portion defining a space between said foot and said basal portion, said basal portion being coupled to said first surface of said first panel, said track extending between said front side and said back side; and
a rail having a basal portion, a leg extending upwardly from said basal portion of said rail and a foot being spaced from said basal portion of said rail, said basal portion of said rail being attached the bed, said foot of said rail being slidably positioned in said space in said track, said basal portion of said rail having a lobe extending upwardly therefrom and being coextensive with said basal portion of said rail, said lobe being spaced from said leg on said rail, said lobe frictionally engaging said leg on said track to inhibit said foot on said track from sliding out of said space;
a plurality of first tie downs, each of said first tie downs being coupled to said first panel wherein each of said first tie downs is configured to have a strap secured thereto for tying the object said first panel, said first tie downs being spaced apart from each other and being distributed on said first surface of said first panel;
a second panel being hingedly coupled to said first panel, said second panel being positionable in a first position having said second panel being oriented co-linear with said first panel wherein said second panel is configured to support the object, said second panel being positionable in a second position having said second panel being oriented perpendicular to said first panel wherein said second panel is configured to inhibit the object from sliding off of said first panel, said second panel having a primary surface, a secondary surface and an outer edge extending therebetween, said outer edge having a forward side, said forward side being hingedly coupled to said back side of said first panel;
a plurality of second tie downs, each of said second tie downs being coupled to said second panel wherein each of said second tie downs is configured to have a strap secured thereto for tying the object said second panel, said second tie downs being distributed on said primary surface of said second panel and said second surface of said second panel; and
a pair of handles, each of said handles being coupled to said secondary surface of said second panel for gripping, each of said handles being recessed into said secondary surface.

* * * * *